(12) United States Patent
Eiselt

(10) Patent No.: US 10,256,959 B2
(45) Date of Patent: Apr. 9, 2019

(54) METHOD AND APPARATUS FOR GENERATING A TONE SIGNAL

(71) Applicant: ADVA Optical Networking SE, Meiningen (DE)

(72) Inventor: Michael Eiselt, Kirchheim (DE)

(73) Assignee: ADVA OPTICAL NETWORKING SE, Meiningen ot Dreissigacker (DE)

( * ) Notice: Subject to any disclaimer, the term of this patent is extended or adjusted under 35 U.S.C. 154(b) by 0 days.

(21) Appl. No.: 15/851,463

(22) Filed: Dec. 21, 2017

(65) Prior Publication Data

US 2018/0183553 A1  Jun. 28, 2018

(30) Foreign Application Priority Data

Dec. 23, 2016  (EP) .................................. 16206667

(51) Int. Cl.
| | |
|---|---|
| H04B 10/50 | (2013.01) |
| H04B 1/16 | (2006.01) |
| H04L 5/00 | (2006.01) |
| H04J 14/02 | (2006.01) |
| H04B 17/24 | (2015.01) |
| H04B 1/715 | (2011.01) |
| H04L 25/02 | (2006.01) |
| H04L 27/26 | (2006.01) |

(52) U.S. Cl.
CPC ......... *H04L 5/0048* (2013.01); *H04B 1/1653* (2013.01); *H04B 1/715* (2013.01); *H04B 10/50* (2013.01); *H04B 10/50575* (2013.01); *H04B 17/24* (2015.01); *H04J 14/0258* (2013.01); *H04L 5/0008* (2013.01); *H04L 25/0228* (2013.01); *H04L 27/2613* (2013.01)

(58) Field of Classification Search
CPC .......... H04B 10/50575; H04B 10/5561; H04B 10/50572; H04B 10/564; H04B 10/541; H04B 10/548; H04B 10/07955; H04B 10/572; H04B 2210/075; H04B 10/40; H04B 10/50
USPC ........................................... 375/261; 370/335
See application file for complete search history.

(56) References Cited

U.S. PATENT DOCUMENTS

| | | | |
|---|---|---|---|
| 6,046,838 A | 4/2000 | Kou et al. | |
| 8,855,215 B2 * | 10/2014 | Roberts | H03L 7/00 375/247 |
| 9,485,554 B1 * | 11/2016 | Kim | H04J 14/0221 14/221 |

OTHER PUBLICATIONS

Extended European Search Report for European Patent Application No. 16206667.4 (dated Jun. 29, 2017).

* cited by examiner

*Primary Examiner* — Sam K Ahn
*Assistant Examiner* — Sarah Hassan
(74) *Attorney, Agent, or Firm* — Jenkins, Wilson, Taylor & Hunt, P.A.

(57) ABSTRACT

A method for generating a tone signal (TS) having a tone frequency, f, wherein the method comprises the following steps: supplying (S1) a binary bit stream (BBS) having a mark pattern with a supply bit rate, BR, to a signal filter unit; and filtering (S2) the supplied binary bit stream (BBS) by said signal filter unit to generate the tone signal (TS), wherein the mark pattern of the binary bit stream (BBS) supplied to said signal filter unit is adapted to minimize a ratio of the supply bit rate, BR, to the tone frequency, f, of the generated tone signal (TS).

18 Claims, 7 Drawing Sheets

METHOD AND APPARATUS FOR GENERATING A TONE SIGNAL

PRIORITY CLAIM

This application claims the benefit of European Patent Application No. 16206667.4, filed Dec. 23, 2016; the disclosure of which is incorporated herein by reference in its entirety.

TECHNICAL FIELD

The invention relates to a method and apparatus for generating a tone signal having a tone frequency, in particular a method and apparatus for generating a pilot tone signal.

TECHNICAL BACKGROUND

Conventional methods for generating a tone signal include direct analog generation of a low frequency tone signal using a digital-analog converter with a sampling rate of at least twice the tone frequency of the tone signal and multiple bits of resolution. It is possible to modulate the generated tone signal onto an optical or electrical carrier. The modulation of the tone signal requires a linear modulation unit to avoid the generation of harmonics. Generating an analog tone signal from a digital signal can be performed by modulating a mark density of a binary signal and by filtering this binary signal. A sigma-delta conversion can be used to generate a binary bit sequence with a minimum of spurious frequencies within a range of interest. However, the rate of the binary bit sequence or binary bit stream in this conventional approach must be at least a multiple of 16 to 20 of the highest tone frequency, e.g. performing an oversampling with at least a factor of 8.

Table 1 illustrates a mark density modulated bit sequence comprising four periods each having 8 bits which can be generated by sigma-delta conversion.

TABLE 1

| -1 | 1  | 1 | 1 | -1 | 1  | -1 | -1 |
|----|----|---|---|----|----|----|----|
| 1  | 1  | 1 | 1 | -1 | -1 | -1 | -1 |
| 1  | -1 | 1 | 1 | -1 | -1 | -1 | 1  |
| -1 | 1  | 1 | 1 | -1 | -1 | -1 | 1  |

The bit sequence illustrated in Table 1 yields a signal spectrum as illustrated in FIG. 1A with a basic frequency $f_b$ of 25 kHz. The basic frequency corresponds to the repletion rate of the bit sequence and equals to the bit rate (800 kbit/s in the example) divided by the length of the bit sequence (32 bits in the example). The spectrum shows a tone signal at a tone frequency of 100 kHz. The sigma-delta conversion shown in the example is based on an oversampling with an oversampling rate OSR of only 4 in order to reduce the bit sequence lengths. This results in relatively large spurious frequency components in the frequency range of interest. A larger oversampling with a higher oversampling rate OSR reduces these frequency components as also illustrated in FIG. 1B where an oversampling rate OSR of 11 was applied for a maximum tone frequency being 80 times the repetition rate of the bit sequence. In the spectrum of FIG. 1A, the oversampling rate OSR is four (OSR=4) for the bit sequence illustrated in Table 1 having 4 periods T each comprising eight bits. In contrast, the bit sequence used for the spectrum illustrated in FIG. 1B uses a bit sequence comprising 80 periods each comprising 22 bits for a maximum tone frequency $f_{max}$=80 resulting in a bit sequence length of 2×11×80=1760 bits. By comparing FIG. 1A and FIG. 1B, it can be seen that the noise-free range is expanded in FIG. 1B.

By increasing the sampling rate, i.e. by repeating each bit the resulting spectrum is not changed. Table 2 illustrates a bit sequence which is generated by resampling the bit sequence of Table 1 with twice the bit rate.

TABLE 2

| -1 | -1 | 1  | 1  | 1 | 1 | 1 | 1 | -1 | -1 | 1  | 1  | -1 | -1 | -1 | -1 |
|----|----|----|----|---|---|---|---|----|----|----|----|----|----|----|----|
| 1  | 1  | 1  | 1  | 1 | 1 | 1 | 1 | -1 | -1 | -1 | -1 | -1 | -1 | -1 | -1 |
| 1  | 1  | -1 | -1 | 1 | 1 | 1 | 1 | -1 | -1 | -1 | -1 | -1 | -1 | 1  | 1  |
| -1 | -1 | 1  | 1  | 1 | 1 | 1 | 1 | -1 | -1 | -1 | -1 | -1 | -1 | 1  | 1  |

FIG. 2A illustrates a signal spectrum of a sigma-delta generated bit stream with a tone signal at $f/f_b$=4 with a higher sampling rate whereas FIG. 2B illustrates a signal spectrum of a resampled signal similar to FIG. 1B.

A multiplication by an alternating sequence +1/−1, e.g. by a Manchester encoding, shifts the signal spectrum to the frequency range around the fundamental frequency of the alternating sequence, in the illustrated example $f_b$=32.

Table 3 illustrates a bit sequence which is generated by multiplying the bit sequence of Table 2 with a +1/−1 alternating binary sequence.

TABLE 3

| -1 | 1  | 1  | -1 | 1 | -1 | 1 | -1 | -1 | 1 | 1  | -1 | -1 | 1  | -1 | 1  |
|----|----|----|----|---|----|---|----|----|---|----|----|----|----|----|----|
| 1  | -1 | 1  | -1 | 1 | -1 | 1 | -1 | -1 | 1 | -1 | 1  | -1 | 1  | -1 | 1  |
| 1  | -1 | -1 | 1  | 1 | -1 | 1 | -1 | -1 | 1 | -1 | 1  | -1 | 1  | 1  | -1 |
| -1 | 1  | 1  | -1 | 1 | -1 | 1 | -1 | -1 | 1 | -1 | 1  | -1 | 1  | 1  | -1 |

FIG. 3A illustrates a spectrum of the sigma-delta generated bit stream multiplied by the alternating sequence as indicated in Table 3 resulting in a tone signal around $f_b=32$.

FIG. 3B illustrates the signal spectrum of a signal shown in FIG. 2B multiplied by the alternating +1/−1 periodic sequence.

The sampling rate can be further increased, for instance doubled. Table 4 illustrates a bit sequence generated by resampling the bit sequence of Table 3 with twice the bit rate.

TABLE 4

| −1 | −1 | 1  | 1  | 1  | 1  | −1 | −1 | 1 | 1 | −1 | −1 | 1 | 1 | −1 | −1 | −1 | −1 | 1 |
|----|----|----|----|----|----|----|----|---|---|----|----|---|---|----|----|----|----|---|
| 1  | 1  | −1 | −1 | 1  | 1  | −1 | −1 | 1 | 1 | −1 | −1 | 1 | 1 | −1 | −1 | −1 | −1 | 1 |
| 1  | 1  | −1 | −1 | −1 | −1 | 1  | 1  | 1 | 1 | −1 | −1 | 1 | 1 | −1 | −1 | −1 | −1 | 1 |
| −1 | −1 | 1  | 1  | 1  | 1  | −1 | −1 | 1 | 1 | −1 | −1 | 1 | 1 | −1 | −1 | −1 | −1 | 1 |
|    |    |    |    |    |    |    |    |   |   |    |    |   |   |    |    |    |    |   |
|    |    |    |    | 1  | 1  | 1  | −1 | −1 | −1 | −1 | 1 | 1 | −1 | −1 | 1 | 1 |    |   |
|    |    |    |    | 1  | −1 | −1 | 1  | 1  | −1 | −1 | 1 | 1 | −1 | −1 | 1 | 1 |    |   |
|    |    |    |    | 1  | −1 | −1 | 1  | 1  | −1 | −1 | 1 | 1 | 1  | 1  | −1 | −1 |   |   |
|    |    |    |    | 1  | −1 | −1 | 1  | 1  | −1 | −1 | 1 | 1 | 1  | 1  | −1 | −1 |   |   |

The resulting spectrum (now also illustrating higher frequencies) shows lines separated by +/−4 from the normalized frequency $f/f_b$ of 32.

FIG. 4A illustrates a signal spectrum of a sigma-delta generated bit stream multiplied by a −1/1 alternating periodic bit sequence with a higher sampling rate or bit rate as illustrated in Table 4 resulting in tone signal components at frequencies $f/f_b=32\pm4=28$ (700 kHz) and 36 (900 kHz).

FIG. 4B illustrates a signal spectrum of the resampled signal of FIG. 3B showing tone signal components at normalized frequencies $f/f_b=1760\pm43=1717$ and 1803.

In the conventional methods for generating a tone signal, the ratio of the bit rate to the tone frequency of the generated tone signal is high. Accordingly, the technical complexity of the tone signal generator is high and requires a high clock rate. Consequently, the consumed electrical power is increased because of the high clock rate.

Accordingly there is a need to provide a method and apparatus which allows to generate a tone signal with a low clock rate.

SUMMARY OF THE INVENTION

The invention provides according to the first aspect a method for generating a tone signal having a tone frequency, wherein the method comprises the steps of:

supplying a binary bit stream having a mark pattern with a supply bit rate to a signal filter unit and filtering the supplied binary bit stream by said signal filter unit to generate the tone signal, wherein the mark pattern of the binary bit stream supplied to said signal filter unit is adapted to minimize a ratio of the supply bit rate to the tone frequency of the generated tone signal.

An advantage of the method according to the first aspect of the present invention is that the bit rate of the supplied binary bit stream is low so that processing of the supplied bit stream can be performed at a low clock rate thus minimizing the required electrical power for processing and reducing any disturbances in the environment caused by the generation of the tone signal.

In a possible embodiment of the method according to the first aspect of the present invention, the binary bit stream is read from a table stored in a data memory and supplied with the supply bit rate to the signal filter unit.

In a further possible alternative embodiment of the method according to the first aspect of the present invention, the binary bit stream is calculated by a processor and supplied with the supply bit rate to the signal filter unit.

In a still further possible embodiment of the method according to the first aspect of the present invention, the supplied binary bit stream is low-pass filtered to generate the tone signal.

In a still further possible embodiment of the method according to the first aspect of the present invention, the supplied binary bit stream is band-pass filtered to generate the tone signal.

In a possible embodiment of the method according to the first aspect of the present invention, the generated tone signal comprises a pilot tone signal.

In a further possible embodiment of the method according to the first aspect of the present invention, the generated pilot tone signal is used to modulate an optical signal.

In a still further possible embodiment of the method according to the first aspect of the present invention, the pilot tone signal used to modulate said optical signal forms a channel label of an optical channel within a wavelength division multiplexed, WDM, network.

In a further possible embodiment of the method according to the first aspect of the present invention, the ratio of the supply bit rate to the tone frequency of the tone signal is in a range between 3.0 and 5.5.

In a still further possible embodiment of the method according to the first aspect of the present invention, the binary bit stream supplied to the signal filter unit has a specific mark pattern which is derived from a periodic bit sequence provided by a sigma-delta conversion.

In a possible embodiment of the method according to the first aspect of the present invention, the periodic bit sequence is shifted by a fraction of its period to provide a shifted periodic sequence and is then multiplied with an alternating binary bit sequence to provide a multiplied periodic bit sequence.

In a still further possible embodiment of the method according to the first aspect of the present invention, the shifted periodic bit sequence is multiplied with an alternating binary bit sequence to provide a multiplied shifted periodic bit sequence.

In a still further possible embodiment of the method according to the first aspect of the present invention, the multiplied periodic bit sequence and the inverted or uninverted multiplied shifted periodic bit sequence are interleaved to calculate the binary bit stream with a specific mark pattern supplied to the signal filter unit.

The invention further provides according to a further aspect a tone signal generation apparatus for generating a tone signal having a tone frequency comprising the features of claim 13.

The invention provides according to the second aspect a tone signal generation apparatus for generating a tone signal having a tone frequency, wherein the tone signal generation apparatus comprises a supply unit adapted to supply a binary bit stream having a mark pattern with a supply bit rate to a signal filter unit of said tone signal generation apparatus, wherein the signal filter unit is configured to filter the binary bit stream to generate the tone signal, wherein the mark pattern of the binary bit stream supplied to the signal filter unit is adapted to minimize a ratio of the supply bit rate to the tone frequency of the tone signal.

In a possible embodiment of the tone signal generation apparatus according to the second aspect of the present invention, the supply unit comprises a data memory which stores the binary bit stream having a specific mark pattern derived from a periodic bit sequence provided by a sigma-delta conversion.

In a still further possible embodiment of the tone signal generation apparatus according to the second aspect of the present invention, the supply unit comprises a processor adapted to calculate the binary bit stream having a specific mark pattern on the basis of a periodic bit sequence provided by a sigma-delta conversion.

In a still further possible embodiment of the tone signal generation apparatus according to the second aspect of the present invention, the signal filter unit comprises a low-pass signal filter unit adapted to low-pass filter the binary bit stream received from the supply unit.

In a still further possible embodiment of the tone signal generation apparatus according to the second aspect of the present invention, the signal filter unit comprises a band-pass signal filter unit adapted to band-pass filter the binary bit stream received from the supply unit.

In a still further possible embodiment of the tone signal generation apparatus according to the second aspect of the present invention, the tone signal output by the signal filter unit forms a pilot tone signal applied to a modulation unit adapted to modulate an optical signal with the pilot tone signal.

The invention further provides according to a further aspect a wavelength division multiplexed, WDM, network comprising the features of claim 18.

The invention provides according to the third aspect a wavelength division multiplexed, WDM, network comprising a tone signal generation apparatus according to the second aspect of the present invention for generating a tone signal having a tone frequency, wherein the tone signal generation apparatus of said WDM network comprises a supply unit adapted to supply a binary bit stream having a mark pattern with a supply bit rate to a signal filter unit which is configured to filter the binary bit stream to generate the tone signal, wherein the mark pattern of the binary bit stream supplied to the signal filter unit is adapted to minimize a ratio of the supply bit rate to the tone frequency of the tone signal, wherein the WDM network further comprises a modulation unit receiving the generated tone signal as a pilot tone signal to modulate an optical signal.

In a possible embodiment of the WDM network according to the third aspect of the present invention, the pilot tone signal forms a channel label of an optical channel of said WDM network.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1A:
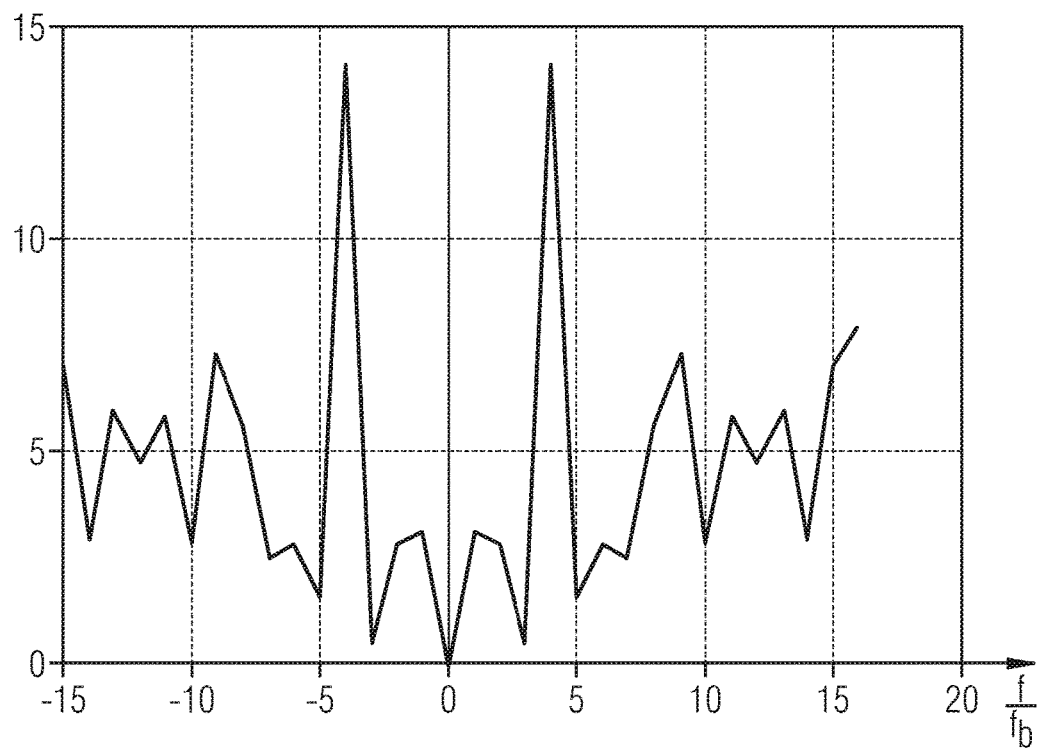
FIGS. 1A, 1B illustrate signal spectra of sigma-delta generated bit streams to illustrate a problem underlying the present invention.
Figure 1B:
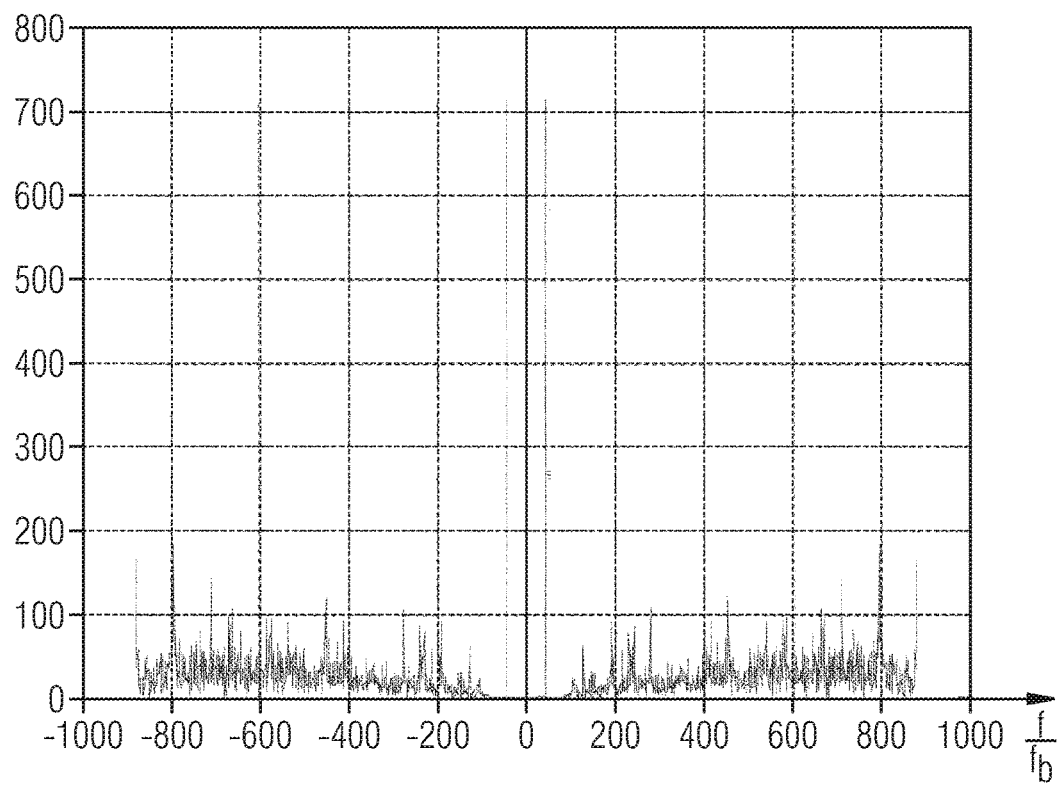
Figure 2A:
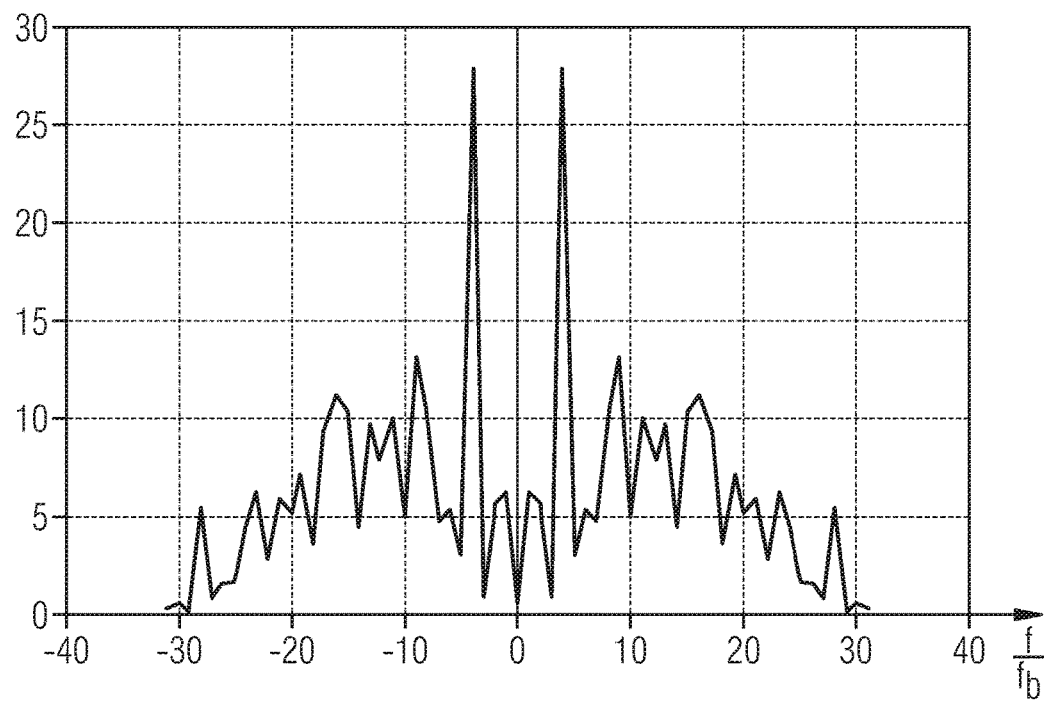
FIGS. 2A, 2B show further signal spectra of sigma-delta generated bit streams to illustrate the problem underlying the present invention.
Figure 2B:
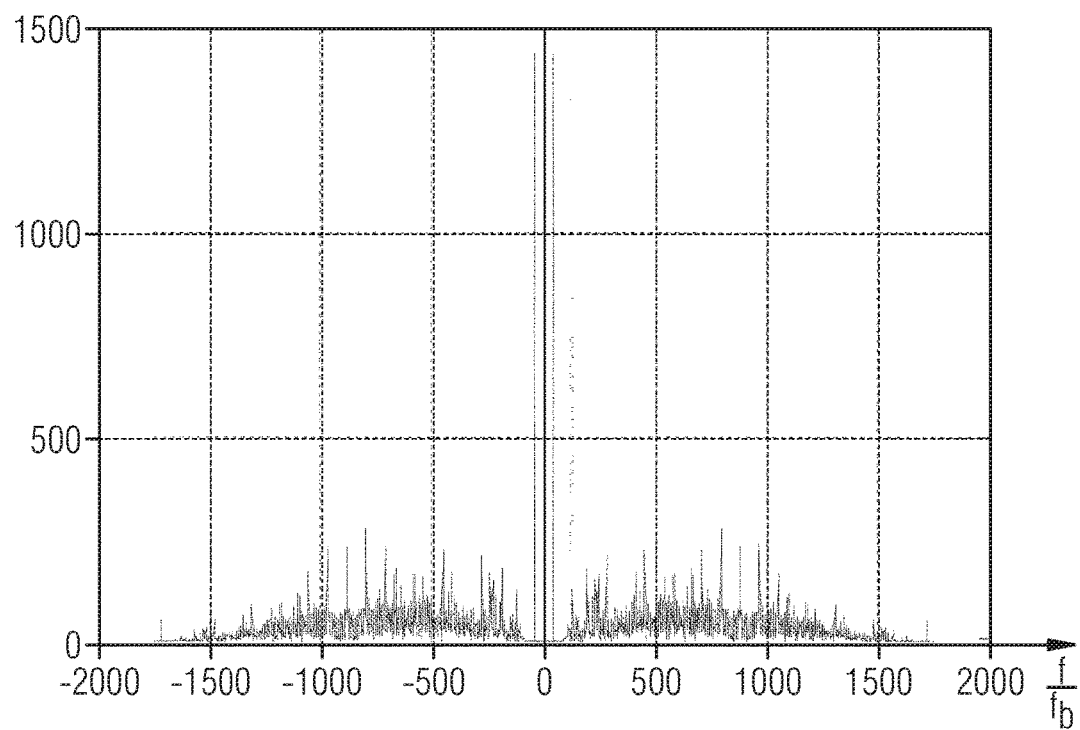
Figure 3A:
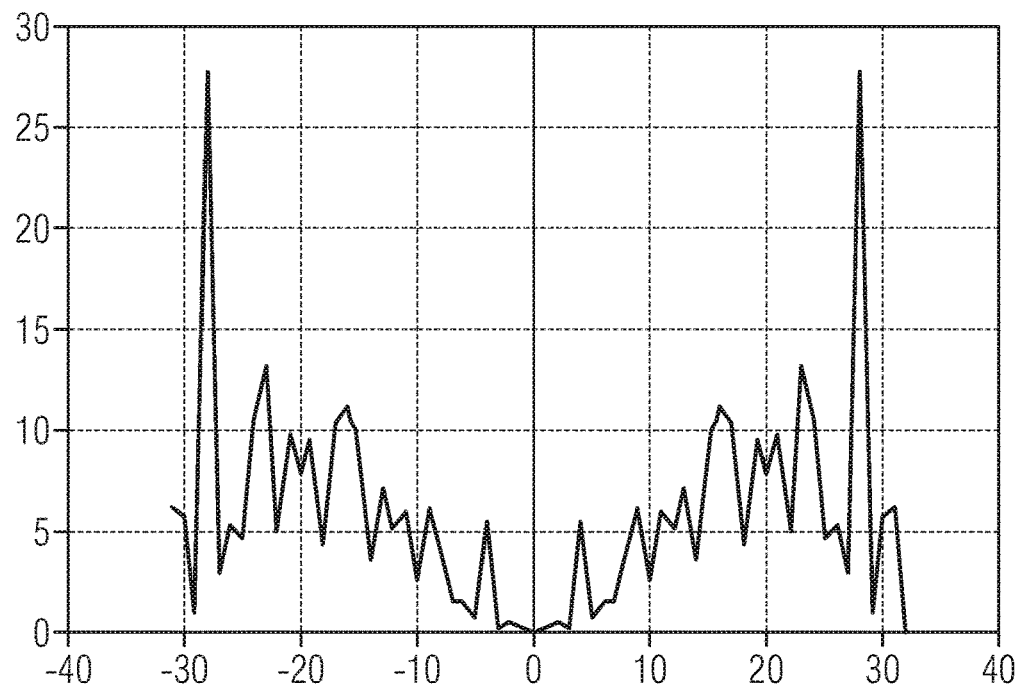
FIGS. 3A, 3B illustrate further signal spectra of sigma-delta generated bit streams to illustrate a problem underlying the present invention.
Figure 3B:
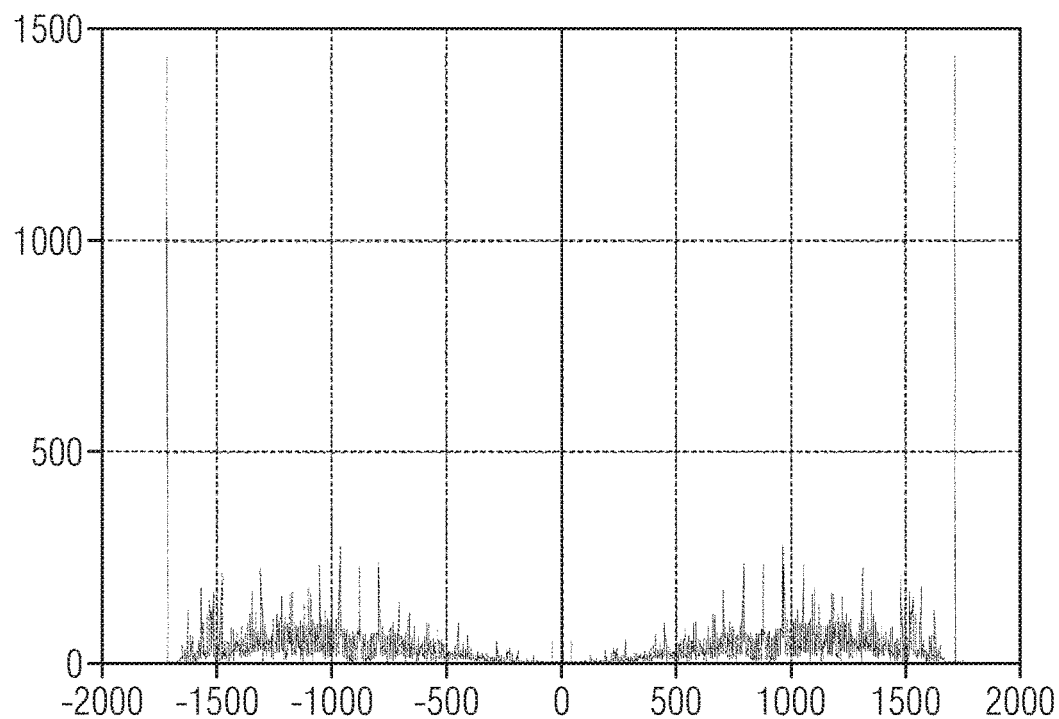
Figure 4A:
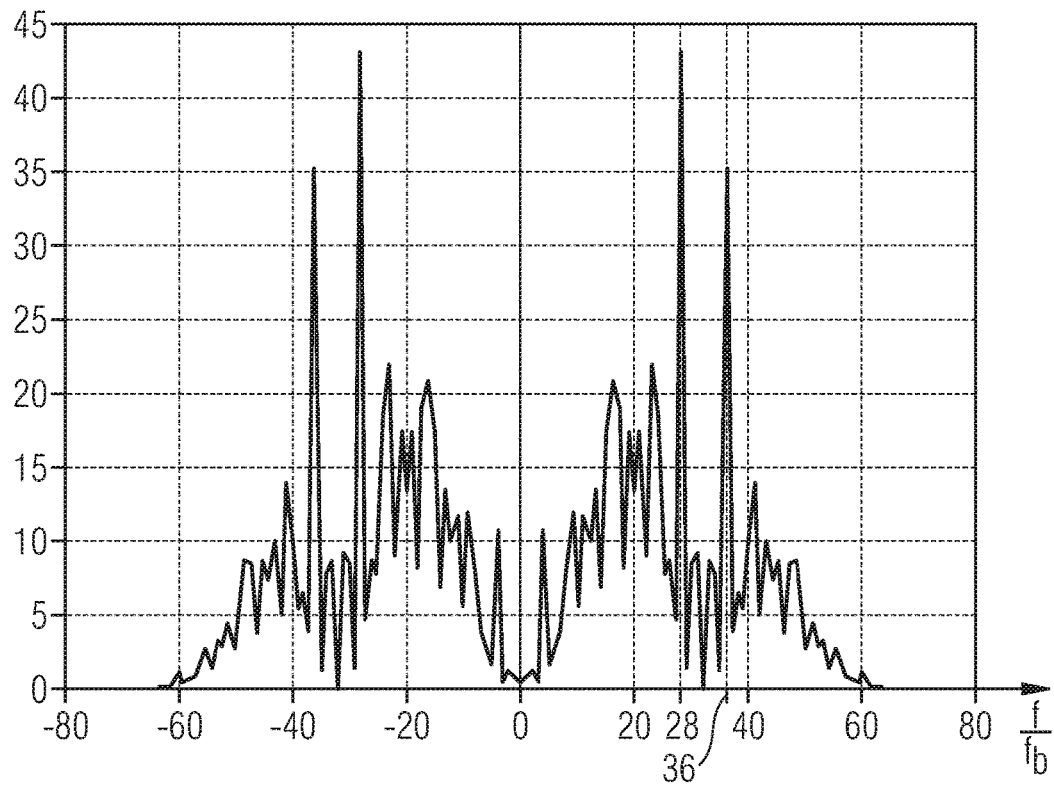
FIGS. 4A, 4B show further signal spectra of sigma-delta generated bit streams for illustrating a problem underlying the present invention.
Figure 4B:
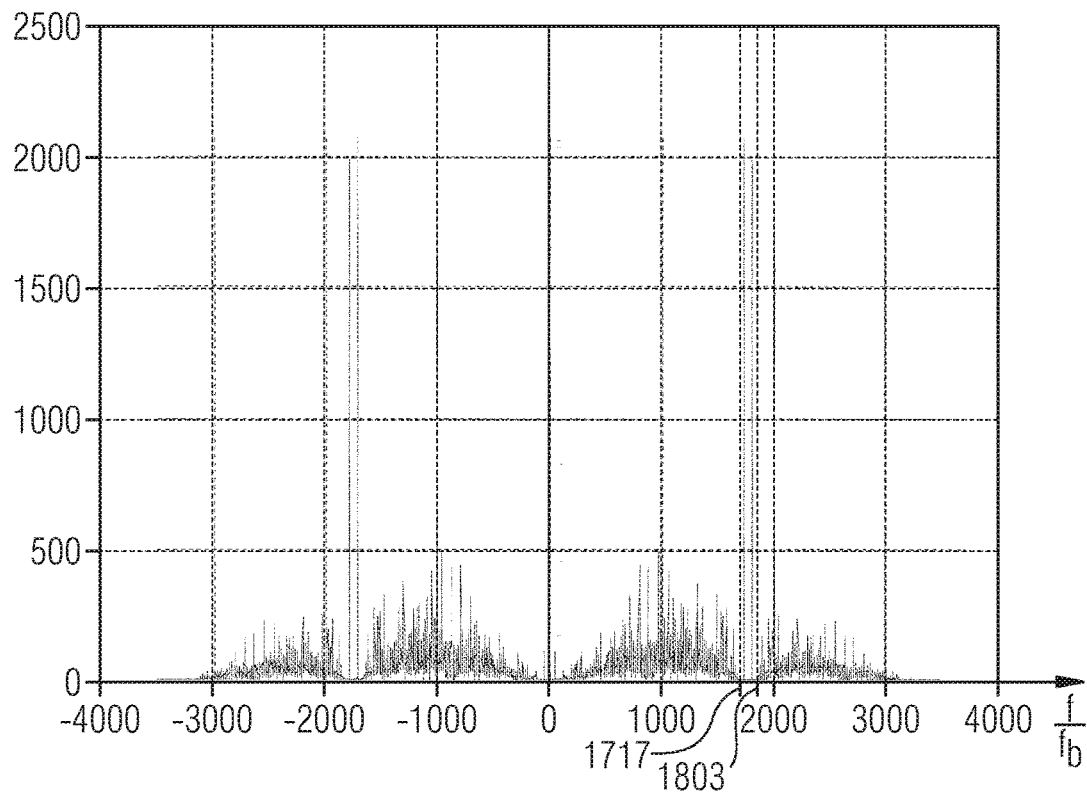
Figure 5:
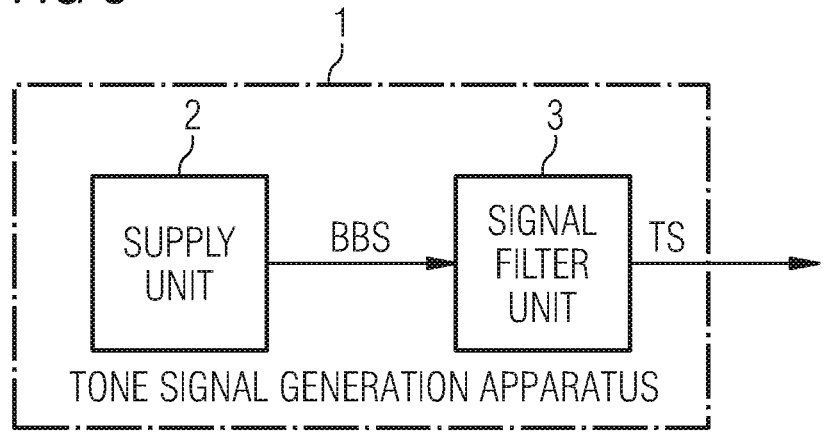
FIG. 5 shows a block diagram for illustrating a possible exemplary embodiment of a tone signal generation apparatus according to an aspect of the present invention.

As can be seen in FIG. 5, a tone signal generation apparatus 1 for generating a tone signal TS having a tone frequency comprises in the illustrated exemplary embodiment a supply unit 2 and a signal filter unit 3. The supply unit 2 is adapted to supply a binary bit stream BBS having a mark pattern with a supply bit rate BR to the signal filter unit 3 of the tone signal generation apparatus 1. The signal filter unit 3 of the tone signal generation apparatus 1 is configured to filter the received binary bit stream BBS to generate the tone signal TS as illustrated in FIG. 5. The mark pattern of the binary bit stream BBS supplied to the signal filter unit 3 is adapted to minimize a ratio of the supply bit rate BR of the supplied binary bit stream BBS to the tone frequency f of the tone signal TS output by the signal filter unit 3.

In a possible embodiment, the supply unit 2 of the tone signal generation apparatus 1 can comprise a data memory which stores a binary bit stream BBS having a specific mark pattern derived from a periodic bit sequence provided by a sigma-delta conversion. In an alternative embodiment, the supply unit 2 of the tone signal generation apparatus 1 can also comprise a processing unit or a processor adapted to calculate the binary bit stream having a specific mark pattern on the basis of a periodic bit sequence provided by sigma-delta conversion.

The signal filter unit 3 of the tone signal generation apparatus 1 is adapted to receive the binary bit stream BBS with a supply bit rate BR from the supply unit 2 via a signal line as illustrated in FIG. 5. In a possible embodiment, the signal filter unit 3 comprises a low-pass signal filter unit adapted to low-pass filter the binary bit stream BBS received from the supply unit 2 to generate the tone signal TS. In a further alternative embodiment, the signal filter unit 3 of the tone signal generation apparatus 1 comprises a band-pass signal filter unit adapted to band-pass filter the binary bit stream BBS received from the supply unit 2.

Figure 6:
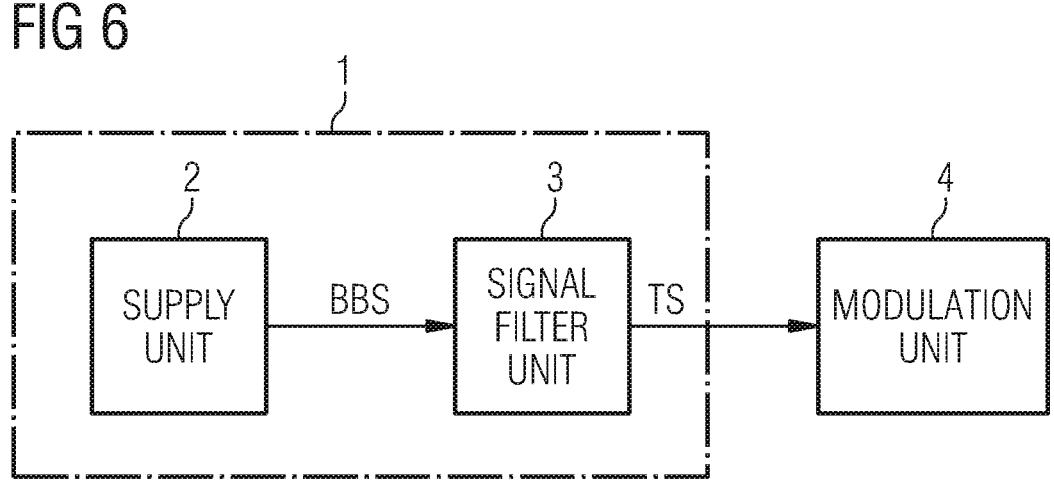
FIG. 6 shows a further block diagram for illustrating a further possible embodiment of a tone signal generation apparatus according to an aspect of the present invention.

In a possible embodiment of the tone signal generation apparatus 1 as illustrated in FIG. 5, the generated tone signal output by the signal filter unit 3 can form a pilot tone signal which is supplied to a modulation unit adapted to modulate an optical signal with the generated pilot tone signal. FIG. 6 illustrates such an embodiment. As can be seen in FIG. 6, a pilot tone signal TS output by the signal filter unit 3 of the tone signal generation apparatus 1 is supplied to a modulation unit 4. The modulation unit 4 is adapted to modulate an optical signal with the pilot tone signal TS received from the signal filter unit 3. In a possible embodiment, the modulation unit 4 can form part of a wavelength division multiplexed, WDM, network. The generated pilot tone signal TS can form in a possible embodiment a channel label of an optical channel within the WDM network. In a possible embodiment the binary bit stream, BBS, can be supplied directly to the modulation unit without the signal filter. The advantage of this setup is that a binary signal is provided to the modulation unit, which reduces linearity requirements on the modulator.

The binary bit stream BBS supplied by the supply unit 2 to the signal filter unit 3 comprises a specific mark pattern which is derived from a periodic bit sequence provided by sigma-delta conversion.

Table 5 below illustrates a periodic bit sequence used for generating a bit sequence comprising the required specific mark pattern.

TABLE 5

| -1 | 1 | 1 | 1 | -1 | 1 | -1 | -1 |
|----|---|---|---|----|---|----|----|
| 1  | 1 | 1 | 1 | -1 | -1| -1 | -1 |
| 1  | -1| 1 | 1 | -1 | -1| -1 | 1  |
| -1 | 1 | 1 | 1 | -1 | -1| -1 | 1  |

The bit sequence illustrated in Table 5 corresponds to the conventional bit sequence illustrated in Table 1. The bit sequence comprises a bit sequence length of 32 bits consisting of 4 periods or rows each comprising 8 bits. The original periodic bit sequence such as illustrated in Tables 1, 5 can be provided by a sigma-delta conversion. The periodic bit sequence as illustrated in Table 5 is shifted in a possible embodiment by a fraction of its period to provide a shifted periodic bit sequence such as illustrated in Table 6 below.

TABLE 6

| 1 | 1 | -1 | 1  | -1 | -1 | 1  | 1  |
|---|---|----|----|----|----|----|----|
| 1 | 1 | -1 | -1 | -1 | -1 | 1  | -1 |
| 1 | 1 | -1 | -1 | -1 | 1  | -1 | 1  |
| 1 | 1 | -1 | -1 | -1 | 1  | -1 | 1  |

In the illustrated embodiment, a shift of a quarter period, i.e. 2 bits, is performed on the bit sequence illustrated in Table 5 to generate the bit sequence illustrated in Table 6. The periodic sequence of Table 5 is multiplied in a possible embodiment with an alternating (−1/1) binary sequence to provide a multiplied periodic bit sequence as illustrated in Table 7 below.

TABLE 7

| 1  | -1 | -1 | 1  | -1 | 1  | -1 | 1  | 1  | -1 | -1 | 1  | 1  | -1 | 1  | -1 |
|----|----|----|----|----|----|----|----|----|----|----|----|----|----|----|----|
| -1 | 1  | -1 | 1  | -1 | 1  | -1 | 1  | 1  | -1 | 1  | -1 | 1  | -1 | 1  | -1 |
| -1 | 1  | 1  | -1 | -1 | 1  | -1 | 1  | 1  | -1 | 1  | -1 | 1  | -1 | -1 | 1  |
| 1  | -1 | -1 | 1  | -1 | 1  | -1 | 1  | 1  | -1 | 1  | -1 | 1  | -1 | -1 | 1  |

Further, the shifted periodic bit sequence as illustrated in Table 6 can be multiplied with an alternating (+1/−1) binary bit sequence to provide a multiplied shifted periodic bit sequence as illustrated in Table 8.

TABLE 8

| 1 | -1 | 1 | -1 | -1 | 1  | 1  | -1 | -1 | 1  | -1 | 1  | 1  | -1 | 1  | -1 |
|---|----|---|----|----|----|----|----|----|----|----|----|----|----|----|----|
| 1 | -1 | 1 | -1 | -1 | 1  | -1 | 1  | -1 | 1  | -1 | 1  | 1  | -1 | -1 | 1  |
| 1 | -1 | 1 | -1 | -1 | 1  | -1 | 1  | -1 | 1  | 1  | -1 | -1 | 1  | 1  | -1 |
| 1 | -1 | 1 | -1 | -1 | 1  | -1 | 1  | -1 | 1  | 1  | -1 | -1 | 1  | 1  | -1 |

Finally, the multiplied periodic bit sequence as illustrated in Table 7 and the inverted or the not inverted multiplied shifted periodic bit sequence (illustrated in Table 8) are interleaved to calculate the binary bit stream with a specific mark pattern as illustrated in Tables 9, 10.

FIG. 9 illustrates a bit sequence obtained by interleaving the binary bit streams from Tables 7 and 8.

TABLE 9

| 1  | 1 | -1 | -1 | -1 | 1 | 1  | -1 | -1 | -1 | 1 | 1  | -1 | 1  | 1 | -1 | 1  | -1 |
|----|---|----|----|----|---|----|----|----|----|---|----|----|----|---|----|----|----|
| -1 | 1 | 1  | -1 | -1 | 1 | 1  | -1 | -1 | -1 | 1 | 1  | -1 | -1 | 1 | 1  | -1 | -1 |
| -1 | 1 | 1  | -1 | 1  | 1 | -1 | -1 | -1 | -1 | 1 | 1  | -1 | -1 | 1 | 1  | -1 | -1 |
| 1  | 1 | -1 | -1 | -1 | 1 | 1  | -1 | -1 | -1 | 1 | 1  | -1 | -1 | 1 | 1  | -1 | -1 |

| 1 | -1 | -1 | 1  | 1  | 1  | 1  | -1 | -1 | 1  | 1  | -1 | -1 |
|---|----|----|----|----|----|----|----|----|----|----|----|----|
| 1 | 1  | -1 | -1 | 1  | 1  | 1  | -1 | -1 | 1  | -1 | -1 | 1  |
| 1 | 1  | 1  | -1 | -1 | 1  | -1 | -1 | 1  | -1 | 1  | 1  | -1 |
| 1 | 1  | 1  | -1 | -1 | 1  | -1 | -1 | 1  | -1 | 1  | 1  | -1 |

Table 10 illustrates a bit sequence obtained by interleaving the bit stream of Table 7 with an inverted bit stream from Table 8.

an alternative embodiment, the supplied binary bit stream BBS is band-pass filtered to generate the tone signal TS in step S2.

TABLE 10

| 1 | −1 | −1 | 1 | −1 | −1 | 1 | 1 | −1 | 1 | 1 | −1 | −1 | −1 | 1 | 1 | 1 | 1 | −1 | −1 | −1 | 1 | 1 | −1 | 1 | −1 | −1 | 1 | 1 | −1 | −1 | 1 |
|---|----|----|---|----|----|---|---|----|---|---|----|----|----|---|---|---|----|----|----|---|----|----|---|----|----|---|---|----|----|----|---|
| −1 | −1 | 1 | 1 | −1 | −1 | 1 | 1 | −1 | 1 | 1 | −1 | −1 | 1 | 1 | −1 | 1 | −1 | −1 | 1 | 1 | −1 | −1 | −1 | −1 | −1 | 1 | 1 | 1 | 1 | −1 | −1 |
| −1 | −1 | 1 | 1 | 1 | −1 | −1 | 1 | −1 | 1 | 1 | −1 | −1 | 1 | 1 | −1 | 1 | −1 | −1 | 1 | −1 | −1 | 1 | 1 | 1 | −1 | −1 | −1 | −1 | 1 | 1 |
| 1 | −1 | −1 | 1 | −1 | −1 | 1 | 1 | −1 | 1 | 1 | −1 | −1 | 1 | 1 | −1 | 1 | 1 | −1 | −1 | 1 | −1 | −1 | 1 | 1 | 1 | −1 | −1 | −1 | −1 | 1 | 1 |

The interleaved bit stream comprises four times the bit rate of the initial sigma-delta sequence.

Figure 8A:
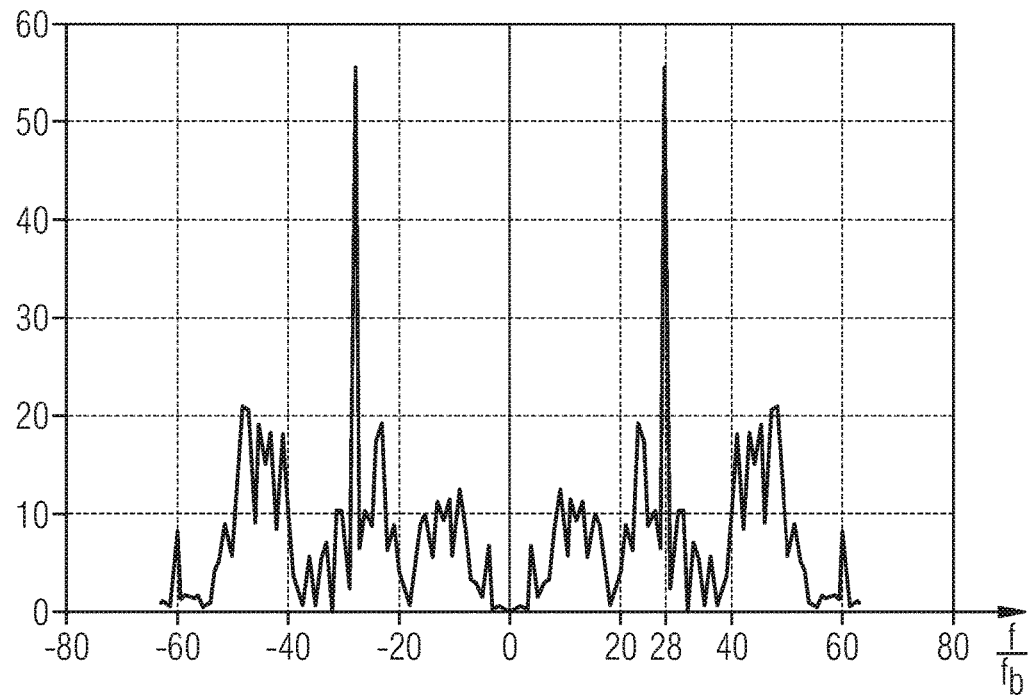
FIGS. 8A, 8B show exemplary signal spectra for illustrating the operation of a method and apparatus according to the present invention.

FIG. 8A shows the signal spectrum of the binary bit sequence illustrated in Table 9. The signal spectrum of FIG. 8A shows a tone signal at $f/f_b=32-4=28$ (at 700 kHz with a basic frequency $f_b=25$ kHz).

Figure 8B:
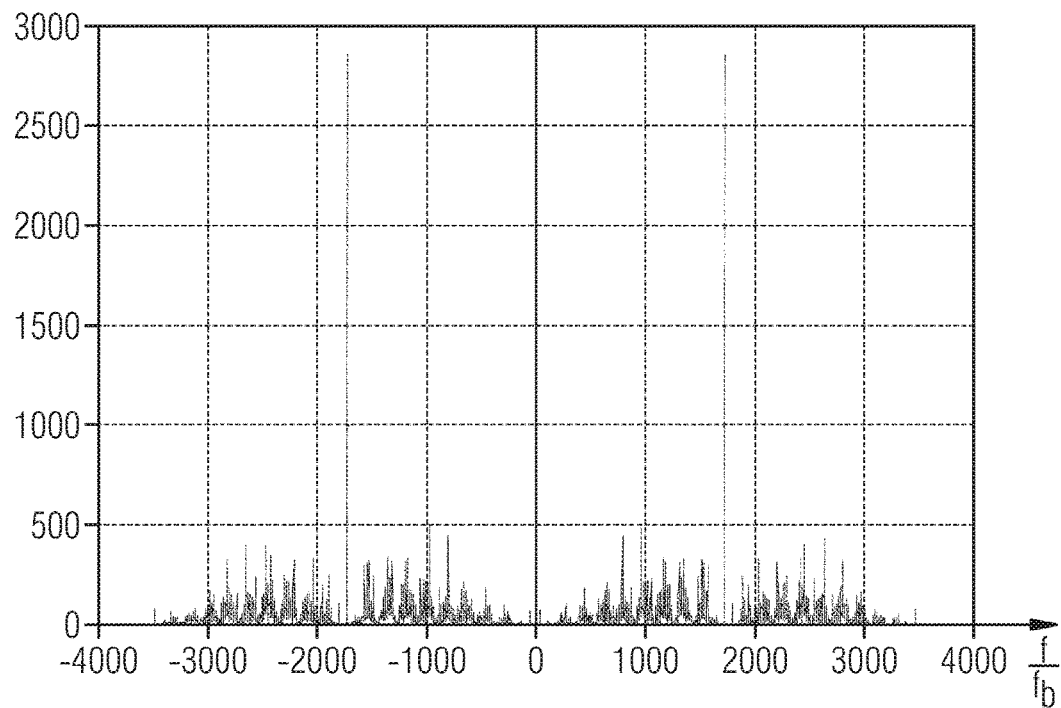

FIG. 8B illustrates a spectrum of a single sideband modulated bit sequence showing a spectral line at $f/f_b=1760-43=1717$. A smaller signal component at a frequency $f=1803$ stems from an imperfect quarter period shift of the bit sequence illustrated in Table 6 (1760/43/4=10.23).

An upper sideband can be obtained when the bit stream illustrated in Table 6 is multiplied by −1/+1 corresponding to a 180-degree shift in the base frequency. This is equivalent to interleaving the bit sequence illustrated in Table 7 with the negative of the multiplied bit sequence.

Figure 9A:
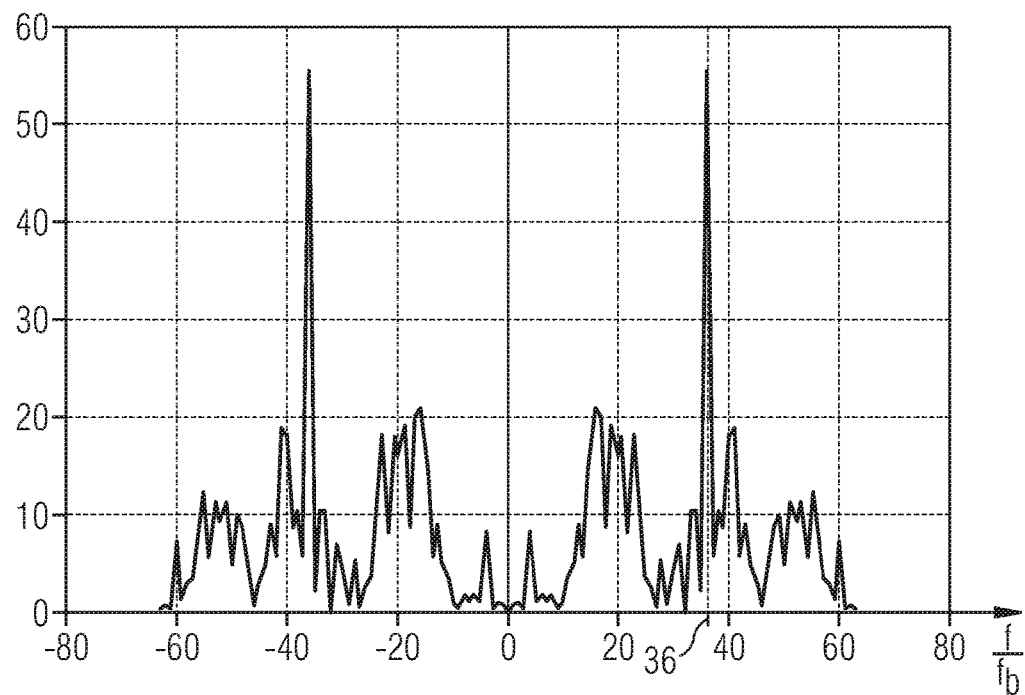
FIGS. 9A, 9B show further exemplary signal spectra for illustrating the operation of a method and apparatus according to an aspect of the present invention.

FIG. 9A illustrates a signal spectrum of the binary bit sequence illustrated in Table 10. The bit sequence of Table is generated by interleaving the bit stream of Table 7 with an inverted bit stream from Table 8. The illustrated spectrum of FIG. 9A shows a spectral line at $f/f_b=32+4=36$ (f=900 kHz with $f_b=25$ kHz).

Figure 9B:
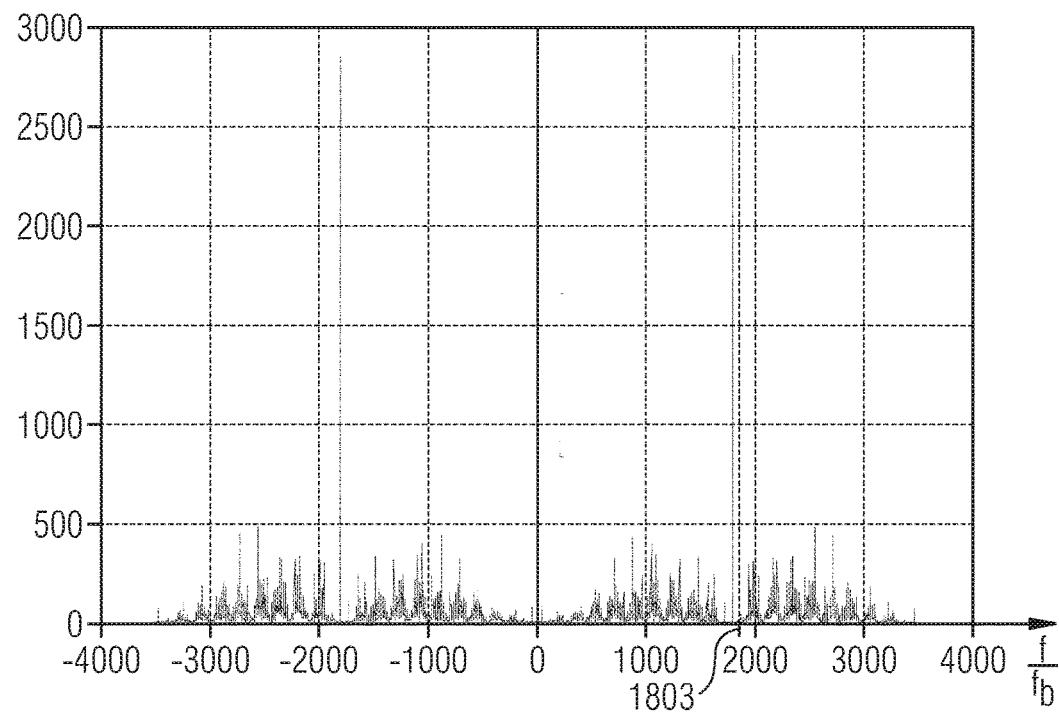

FIG. 9B illustrates a signal spectrum of an upper sideband modulated bit sequence from above showing a spectral line at $f/f_b=1760+43=1803$ (f=45,079 MHz with $f_b=25$ kHz). The bit stream length for this example is 1760 bits. So, for a base frequency of 25 kHz, the initial supply bit rate would be 1760×25 kbit/s=44 Mbit/s. After twice doubling the sampling rate, the supply bit rate is 176 Mbit/s.

Figure 7:
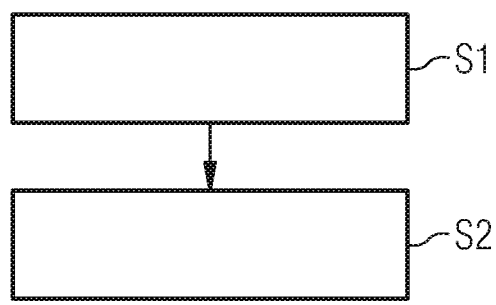
FIG. 7 shows a flowchart of a possible exemplary embodiment of a method for generating a tone signal according to an aspect of the present invention.

FIG. 7 shows a flowchart of a possible exemplary embodiment of a method for generating a tone signal TS having a tone frequency according to a further aspect of the present invention. In the illustrated exemplary embodiment, the method comprises two main steps.

In a first step S1, a binary bit stream BBS having a mark pattern with a supply bit rate is supplied to a signal filter unit.

In a further step S2, the supplied binary bit stream BBS is filtered by the signal filter unit to generate the tone signal TS. The mark pattern of the binary bit stream BBS supplied to the signal filter unit in step S1 is adapted to minimize a ratio of the supplied bit rate BR to the tone frequency $f_+$ of the generated tone signal TS. In a possible embodiment of the method as illustrated in FIG. 7, the binary bit stream BBS supplied to the signal filter unit in step S1 can be read from a table stored in a data memory and then supplied with the supply bit rate to the signal filter unit. In an alternative embodiment of the method illustrated in FIG. 7, the binary bit stream BBS supplied to the signal filter unit in step S1 is calculated by a processing unit or processor on the basis of a periodic bit sequence provided by a sigma-delta conversion.

In a possible embodiment of the method illustrated in FIG. 7, the supplied binary bit stream can be low-pass filtered in step S2 to generate the desired tone signal TS. In The tone signal TS generated in step S2 can form a pilot tone signal which is supplied to a modulation unit. The generated pilot tone signal can be used to modulate an optical signal. In a possible embodiment, the generated pilot tone signal can be used to modulate an optical signal within a wavelength division multiplexed, WDM, network. In a possible embodiment, the pilot tone signal TS used to modulate the optical signal forms a channel label of an optical channel within the wavelength division multiplexed, WDM, network. In a possible embodiment of the method illustrated in FIG. 7, the ratio of the supply bit rate to the tone frequency of the generated tone signal is in a range between 3.0 and 5.5.

The tone frequency of the tone signal TS can be calculated on the basis of the bit rate BR, the number of bits in each frame $N_f$ and the number of periods $N_p$ in each frame as follows:

$$f=BR\times Np/Nf(=BR/2\times OSR)$$

By multiplication with the alternating bit sequence +1/−1 and by interleaving, the length of the frame (in bits) can be increased, for instance to four times $N_f$. At the same time, by multiplication with the +1/−1 the alternating bit sequence, the tone frequency of the tone signal is shifted to a higher frequency, i.e. to a frequency f'=BR/4 (+/−) BR×Np/Nf'. The operation (+/−) depends which sign is used for the bit stream illustrated in Table 8, i.e. whether the bit stream of Table 9 (−) or Table 10 (+) is generated.

With the above equation for the tone frequency of the tone signal TS, the ratio of the bit rate BR to the tone frequency f' can be expressed as follows:

$$BR/f'=1/(0.25(+/-)Np/Nf')=4/1(+/-)Np/Nf)$$

Considering an upper and lower limit and with Nf/Np=2×OSR (oversampling rate) one gets:

$$4/(1+\tfrac{1}{2}OSR)\leq BR/f'\leq 4/(1-\tfrac{1}{2}OSR)$$

Using a minimum oversampling rate OSR of 2 the ratio between the bit rate BR and the frequency f' of the tone signal TS (BR/f') is between 3.2 and 5.34.

Since in a baseband an oversampling rate OSR results in a maximum tone frequency of $$f_{tone,max} = \frac{BR}{2\cdot OSR}$$

for a single period of a tone at the maximum frequency, a frame length of 2OSR is required. If multiple tones are required, the minimum frame length must cover at least a full period of the lowest tone frequency.

To yield tone frequency at $BR\pm f_{tone,baseband}$ a supply bit rate must be twice the initial sampling bit rate BR. For a single sideband modulation SSB, the supply bit rate must be four times the initial sampling bit rate BR.

For example, to generate tone signals with a frequency around 100 kHz, the initial sampling rate must be 100 kbps. For an oversampling with an oversampling rate OSR=10, the maximum baseband frequency is 5 kHz. For SSB modulation, the bit rate BR or digital data rate from a processor must be 400 kbps. The resulting tone range is then 95 to 105 kHz.

With the method and apparatus according to the present invention, a sigma-delta generated binary sequence can be sampled by a bit alternating sequence (1/–1) to convert the tone frequency into a range around half of the bit rate. Further, the sampled binary sequence is interleaved with a sample sequence which is shifted by a quarter tone period to generate a single sideband SSB tone signal TS. With the method and apparatus according to the present invention, a tone signal with a tone frequency can be generated based on binary signals or binary bit sequences BBS where the binary signal rate is only approximately four times the tone frequency. It is possible to use a non-linear modulation unit as it is driven by a binary signal. Accordingly, the modulation unit used to imprint the tone signal TS onto an optical or electrical carrier does not need to be linear since a binary signal is used.

The invention claimed is:

1. A method for generating a tone signal having a tone frequency,
    wherein the method comprises the following steps:
        supplying a binary bit stream having a mark pattern with a supply bit rate, to a signal filter unit; and
        filtering the supplied binary bit stream by said signal filter unit to generate the tone signal, wherein the mark pattern of the binary bit stream supplied to said signal filter unit is adapted to minimize a ratio of the supply bit rate to the tone frequency of the generated tone signal and wherein the ratio of the supply bit rate to the tone frequency of the tone signal is in a range between 3.0 and 5.5.

2. The method according to claim 1, wherein the binary bit stream is read from a table stored in a data memory and supplied with the supply bit rate to said signal filter unit.

3. The method according to claim 1, wherein the binary bit stream is calculated by a processor and supplied with the supply bit rate to said signal filter unit.

4. The method according to claim 1, wherein the supplied binary bit stream is low-pass filtered or band-pass filtered to generate the tone signal.

5. The method according to claim 1, wherein the generated tone signal comprises a pilot tone signal.

6. The method according to claim 5, wherein the generated pilot tone signal is used to modulate an optical signal.

7. The method according to claim 6, wherein the pilot tone signal used to modulate said optical signal forms a channel label of an optical channel within a wavelength division multiplexed, network.

8. The method according to claim 1, wherein the binary bit stream supplied to said signal filter unit has a specific mark pattern which is derived from a periodic bit sequence provided by a sigma-delta conversion.

9. The method according to claim 8, wherein the periodic bit sequence is shifted by a fraction of its period to provide a shifted periodic sequence and is multiplied with an alternating binary bit sequence to provide a multiplied periodic bit sequence.

10. The method according to claim 9, wherein the shifted periodic bit sequence is multiplied with an alternating binary bit sequence to provide a multiplied shifted periodic bit sequence.

11. The method according to claim 10, wherein the multiplied periodic bit sequence and the inverted or uninverted multiplied shifted periodic bit sequence are interleaved to calculate the binary bit stream (BBS) with a specific mark pattern supplied to said signal filter unit.

12. A tone signal generation apparatus for generating a tone signal having a tone frequency, wherein the tone signal generation apparatus comprises:
    a supply unit adapted to supply a binary bit stream having a mark pattern with a supply bit rate to a signal filter unit of said tone signal generation apparatus, wherein the signal filter unit is configured to filter the binary bit stream to generate the tone signal, wherein the mark pattern of the binary bit stream supplied to said signal filter unit is adapted to minimize a ratio of the supply bit rate to the tone frequency of said tone signal and wherein the ratio of the supply bit rate to the tone frequency of the tone signal is in a range between 3.0 and 5.5.

13. The tone signal generation apparatus according to claim 12, wherein the supply unit comprises a data memory which stores the binary bit stream having a specific mark pattern derived from a periodic bit sequence provided by a sigma-delta conversion.

14. The tone signal generation apparatus according to claim 12, wherein the supply unit comprises a processor adapted to calculate the binary bit stream having a specific mark pattern on the basis of a periodic bit sequence provided by sigma-delta conversion.

15. The tone signal generation apparatus according to claim 12, wherein the signal filter unit comprises a low-pass signal filter unit adapted to low-pass filter the binary bit stream received from said supply unit or a band-pass signal filter unit adapted to band-pass filter the binary bit stream received from said supply unit.

16. The tone signal generation apparatus according to claim 12, wherein the tone signal output by said signal filter unit forms a pilot tone signal applied to a modulation unit adapted to modulate an optical signal with the pilot tone signal.

17. A wavelength division multiplexed network comprising a tone signal generation apparatus for generating a tone signal having a tone frequency, wherein the tone signal generation apparatus of said WDM network comprises
    a supply unit adapted to supply a binary bit stream having a mark pattern with a supply bit rate, to a signal filter unit which is configured to filter the binary bit stream to generate the tone signal, wherein the mark pattern of the binary bit stream supplied to the signal filter unit is adapted to minimize a ratio of the supply bit rate to the tone frequency of said tone signal, wherein the ratio of the supply bit rate to the tone frequency of the tone signal is in a range between 3.0 and 5.5, and
    wherein the WDM network further comprises a modulation unit receiving the generated tone signal as a pilot tone signal to modulate an optical signal.

18. The WDM network according to claim 17, wherein the pilot tone signal forms a channel label of an optical channel of said WDM network.

* * * * *